(12) United States Patent
Bartels et al.

(10) Patent No.: US 10,899,980 B2
(45) Date of Patent: Jan. 26, 2021

(54) KINETIC HYDRATE INHIBITORS FOR CONTROLLING GAS HYDRATE FORMATION IN WET GAS SYSTEMS

(71) Applicant: ChampionX USA Inc., Sugar Land, TX (US)

(72) Inventors: Jeremy Wayne Bartels, Sugar Land, TX (US); Regan Andrew Jones, Sugar Land, TX (US); Jeff Michael Servesko, Sugar Land, TX (US)

(73) Assignee: CHAMPIONX USA INC., Sugar Land, TX (US)

( * ) Notice: Subject to any disclaimer, the term of this patent is extended or adjusted under 35 U.S.C. 154(b) by 52 days.

(21) Appl. No.: 16/104,794

(22) Filed: Aug. 17, 2018

(65) Prior Publication Data

US 2019/0055484 A1  Feb. 21, 2019

Related U.S. Application Data

(60) Provisional application No. 62/547,241, filed on Aug. 18, 2017.

(51) Int. Cl.
| | |
|---|---|
| *C10G 75/02* | (2006.01) |
| *C08F 20/56* | (2006.01) |
| *C10L 3/10* | (2006.01) |
| *C08F 220/56* | (2006.01) |
| *C08F 222/28* | (2006.01) |
| *C09K 8/528* | (2006.01) |
| *C09K 8/54* | (2006.01) |
| *C10L 10/04* | (2006.01) |
| *C08L 33/26* | (2006.01) |
| *C23F 11/14* | (2006.01) |

(52) U.S. Cl.
CPC .............. *C10G 75/02* (2013.01); *C08F 20/56* (2013.01); *C08F 220/56* (2013.01); *C08F 222/28* (2013.01); *C08L 33/26* (2013.01); *C09K 8/528* (2013.01); *C09K 8/54* (2013.01); *C10L 3/107* (2013.01); *C10L 10/04* (2013.01); *C08F 2500/02* (2013.01); *C09K 2208/22* (2013.01); *C09K 2208/32* (2013.01); *C10L 2230/14* (2013.01); *C10L 2250/04* (2013.01); *C23F 11/145* (2013.01)

(58) Field of Classification Search
None
See application file for complete search history.

(56) References Cited

U.S. PATENT DOCUMENTS 8,921,478 B2 * 12/2014 Conrad .................. C10L 3/003
524/555

FOREIGN PATENT DOCUMENTS

| WO | 2008/094781 A2 | 8/2008 |
| WO | 2010/045520 A1 | 4/2010 |
| WO | 2010/045523 A1 | 4/2010 |

OTHER PUBLICATIONS

International Search Report and Written Opinion issued for PCT/US2018/046975 dated Dec. 4, 2018, 14 pages.

* cited by examiner

*Primary Examiner* — Tam M Nguyen
(74) *Attorney, Agent, or Firm* — Stinson LLP

(57) ABSTRACT

Polymers are provided for use in inhibiting gas hydrate formation and/or corrosion in hydrocarbon-containing fluids. The polymer comprises repeat units derived from a first monomer comprising N-[3-(dibutylamino)propyl]methacrylamide (DBAPAMA) or an alkyl, acetyl, acryloyl or benzyl quaternary salt thereof, N-[3-(diisobutyl)propyl]methacrylamide or an alkyl, acetyl, acryloyl or benzyl quaternary salt thereof, N-[3-(diisopentyl)propyl]methacrylamide or an alkyl, acetyl, acryloyl or benzyl quaternary salt thereof, or a combination thereof; and repeat units derived from a second monomer comprising acrylamide, N-alkylacrylamide, N-alkyl (alkyl)acrylamide, ((dialkylamino)alkyl)acrylamide or an alkyl or benzyl quaternary salt thereof, ((dialkylamino)alkyl)alkylacrylamide or an alkyl or benzyl quaternary salt thereof, acrylic acid, alkyl acrylate, N,N-(dialkylamino)alkyl acrylate or an alkyl or benzyl quaternary salt thereof, N,N-(dialkylamino)alkyl (alkyl)acrylate or an alkyl or benzyl quaternary salt thereof, hydroxyalkyl acrylate, hydroxyalkyl (alkyl)acrylate, acrylamido alkyl sulfonic acid or a salt thereof, a diallyl dialkyl quaternary ammonium salt, or a combination thereof. The second monomer does not comprise the first monomer.

12 Claims, No Drawings

KINETIC HYDRATE INHIBITORS FOR CONTROLLING GAS HYDRATE FORMATION IN WET GAS SYSTEMS

CROSS REFERENCE TO RELATED APPLICATIONS

This application claims the benefit of U.S. Provisional Patent Application Ser. No. 62/547,241 filed on Aug. 18, 2017, the disclosure of which is incorporated herein by reference in its entirety.

STATEMENT REGARDING FEDERALLY SPONSORED RESEARCH OR DEVELOPMENT

Not applicable.

THE NAMES OF PARTIES TO A JOINT RESEARCH AGREEMENT

Not applicable.

REFERENCE TO A SEQUENCE LISTING, TABLE, OR COMPUTER PROGRAM LISTING APPENDIX SUBMITTED ON A COMPACT DISC AND AN INCORPORATION-BY-REFERENCE OF THE MATERIAL ON A COMPACT DISC

Not applicable.

STATEMENT REGARDING PRIOR DISCLOSURES BY THE INVENTOR OR JOINT INVENTORS

Not applicable.

FIELD OF THE INVENTION

Polymers and compositions are provided and can be used, for example, in methods for inhibiting hydrate formation in a fluid comprising water and a gas or a liquid hydrocarbon, of for inhibiting corrosion.

BACKGROUND OF THE INVENTION

Natural gas hydrates are crystalline solids composed of water and gas. In these solids, the gas molecules (guests) are trapped in water cavities (host) that are composed of hydrogen-bonded water molecules. Methane is the main gas in naturally occurring gas hydrates, however carbon dioxide, hydrogen sulfide, and less frequently, other hydrocarbons such as ethane and propane can be found within the hydrate structure. In 1934, Hammerschmidt determined that natural gas hydrates were blocking gas transmission lines, frequently at temperatures above the ice point. This discovery caused a more pragmatic interest in gas hydrates and led to the regulation of the water content in natural gas pipelines.

Gas hydrates can be easily formed during the transportation of oil and gas in pipelines under certain conditions. Factors affecting gas hydrate formation include gas composition, water content, temperature, and pressure, particularly low temperature and high pressure. While these crystalline cage-like structures are initially small, they are able to agglomerate into solid masses called gas hydrate plugs. The formation of gas hydrates within a pipeline often results in lost oil or gas production, damage to transmission lines and equipment, and safety hazard to field workers.

Three types of hydrate inhibitors are currently available to the energy industry for controlling gas hydrates: thermodynamic hydrate inhibitors (THIs), kinetic hydrate inhibitors (KHIs), and anti-agglomerants (AAs). Kinetic hydrate inhibitors are substances that can delay gas hydrate nucleation and crystal growth at a given temperature and pressure. Water-soluble polymers combined with small organic molecules are commonly used as kinetic hydrate inhibitors. The polymers must contain functional group(s) capable of hydrogen bonding to water molecules or gas hydrate particle surfaces and hydrophobic group(s) adjacent to the hydrogen bonding groups.

Accordingly, there is an ongoing need for compositions and methods that effectively prevent hydrate formations in water and gas transportation and handing processes, particularly those formulations without an oil phase which results in a water cut approaching 100%.

BRIEF SUMMARY OF THE INVENTION

A polymer is provided which comprises repeat units derived from a first monomer and repeat units derived from a second monomer. The first monomer comprises N-[3-(dibutylamino)propyl]methacrylamide (DBAPAMA) or an alkyl, acetyl, acryloyl, or benzyl quaternary salt thereof, N-[3-(diisobutyl)propyl]methacrylamide or an alkyl, acetyl, acryloyl, or benzyl quaternary salt thereof, N-[3-(diisopentyl)propyl]methacrylamide or an alkyl, acetyl, acryloyl, or benzyl quaternary salt thereof, or a combination thereof. The second monomer comprises acrylamide, N-alkylacrylamide, N-alkyl (alkyl)acrylamide, ((dialkylamino)alkyl)acrylamide or an alkyl or benzyl quaternary salt thereof, ((dialkylamino)alkyl)alkylacrylamide or an alkyl or benzyl quaternary salt thereof, acrylic acid, alkyl acrylate, N,N-(dialkylamino)alkyl acrylate or an alkyl or benzyl quaternary salt thereof, N,N-(dialkylamino)alkyl (alkyl)acrylate or an alkyl or benzyl quaternary salt thereof, hydroxyalkyl acrylate, hydroxyalkyl (alkyl)acrylate, acrylamido alkyl sulfonic acid or a salt thereof, a diallyl dialkyl quaternary ammonium salt, or a combination thereof. The second monomer does not comprise the first monomer.

A composition is provided for hydrate inhibition or corrosion inhibition. The composition comprises a polymer and an organic polar solvent, a non-polar solvent, or a combination thereof, wherein the polymer comprises the polymer as described above or a polymer comprised of repeat units derived from a monomer comprising N-[3-(dibutylamino)propyl]methacrylamide (DBAPAMA) or an alkyl, acetyl, acryloyl or benzyl quaternary salt thereof, N-[3-(diisobutyl)propyl]methacrylamide or an alkyl, acetyl, acryloyl or benzyl quaternary salt thereof, N-[3-(diisopentyl)propyl]methacrylamide or an alkyl, acetyl, acryloyl or benzyl quaternary salt thereof, or a combination thereof.

Additionally, a method is provided for inhibiting hydrate formation in a fluid comprising water, a gas, and optionally a liquid hydrocarbon. The method comprises contacting the fluid with an effective hydrate-inhibiting amount of the polymer or the composition.

Another method is provided for inhibiting corrosion at a surface, the method comprising adding the polymer or the composition to a fluid which contacts a surface of a wellbore or equipment used in production, processing, transportation, storage or separation of the fluid to inhibit corrosion on the surface. The fluid comprises a hydrocarbon such as natural gas or a liquid hydrocarbon.

Other objects and features will be in part apparent and in part pointed out hereinafter.

BRIEF DESCRIPTION OF THE SEVERAL VIEWS OF THE DRAWING

Not applicable.

DETAILED DESCRIPTION OF THE INVENTION

Polymers and compositions are provided with improved hydrate inhibition and corrosion inhibition performance in production streams having a high water cut. In particular, these polymers and compositions are well suited for wet gas systems. These streams pose a challenge to control gas hydrate formation because of the high water-cut as the efficacy of the hydrate inhibitor is sometimes reduced in the absence of an oil phase. Such production streams can occur in sour gas fields having high levels of hydrogen sulfide present. For example, Karan field, Saudi Aramco's offshore non-associated gas field, produces gas that is sour (2% hydrogen sulfide and 8% carbon dioxide) and lean with no hydrocarbon condensate. Water condensation throughout the pipeline used to transport the production streams creates a high risk of both corrosion and gas hydrates during winter. The polymers and compositions are effective in sour systems prone to clathrate hydrates and corrosion.

A polymer is provided which is effective in inhibiting gas hydrate formation and/or inhibiting corrosion. The polymer comprises repeat units derived from a first monomer and repeat units derived from a second monomer.

The first monomer comprises N-[3-(dibutylamino)propyl] methacrylamide (DBAPAMA) or an alkyl, acetyl, acryloyl or benzyl quaternary salt thereof, N-[3-(diisobutyl)propyl] methacrylamide or an alkyl, acetyl, acryloyl or benzyl quaternary salt thereof, N-[3-(diisopentyl)propyl]methacrylamide or an alkyl, acetyl, acryloyl or benzyl quaternary salt thereof, or a combination thereof.

Preferably, the first monomer comprises DBAPAMA or an alkyl, acetyl, acryloyl or benzyl quaternary salt thereof.

The first monomer can comprise N-[3-(diisobutyl)propyl] methacrylamide or an alkyl, acetyl, acryloyl or benzyl quaternary salt thereof.

The first monomer can comprise N-[3-(diisopentyl)propyl]methacrylamide or an alkyl, acetyl, acryloyl or benzyl quaternary salt thereof.

The second monomer comprises acrylamide, N-alkylacrylamide, N-alkyl (alkyl)acrylamide, ((dialkylamino)alkyl)acrylamide or an alkyl or benzyl quaternary salt thereof, ((dialkylamino)alkyl)alkylacrylamide or an alkyl or benzyl quaternary salt thereof, acrylic acid, alkyl acrylate, N,N-(dialkylamino)alkyl acrylate or an alkyl or benzyl quaternary salt thereof, N,N-(dialkylamino)alkyl (alkyl)acrylate or an alkyl or benzyl quaternary salt thereof, hydroxyalkyl acrylate, hydroxyalkyl (alkyl)acrylate, acrylamido alkyl sulfonic acid or a salt thereof, a diallyl dialkyl quaternary ammonium salt, or a combination thereof. The second monomer does not comprise the first monomer.

The second monomer can comprise the N-alkylacrylamide, the N-alkyl (alkyl)acrylamide, or a combination thereof. Preferably, the N-alkylacrylamide comprises isopropylacrylamide (IPA), and the N-alkyl (alkyl)acrylamide comprises isopropylmethacrylamide (IPMA).

The second monomer can comprise the ((dialkylamino) alkyl)acrylamide or an alkyl quaternary salt thereof, the ((dialkylamino)alkyl)alkylacrylamide or an alkyl quaternary salt thereof, or a combination thereof. Preferably, the ((dialkylamino)alkyl)acrylamide or an alkyl quaternary salt thereof comprises ((dimethylamino)propyl)acrylamide, acrylamidopropyl trimethylammonium chloride (APTAC), or a combination thereof, and the ((dialkylamino)alkyl) alkylacrylamide or an alkyl quaternary salt thereof comprises methacrylamidopropyl trimethylammonium chloride (MAPTAC), N-(2-(dimethylamino)ethyl)methacrylamide, N-(3-(dimethylamino)propyl)methacrylamide, or a combination thereof.

The second monomer can comprise the N,N-(dialkylamino)alkyl acrylate or an alkyl or benzyl quaternary salt thereof, or the N,N-(dialkylamino)alkyl (alkyl)acrylate or an alkyl or benzyl quaternary salt thereof. Preferably, the N,N-(dialkylamino)alkyl acrylate or an alkyl or benzyl quaternary salt thereof comprises [(2-acryloyloxy)ethyl]trimethyl ammonium chloride (AETAC), [(2-acryloyloxy)ethyl] dimethyl benzyl ammonium chloride (AEDBAC), or a combination thereof, and the N,N-(dialkylamino)alkyl (alkyl)acrylate or an alkyl or benzyl quaternary salt thereof comprises [(2-methacryloyloxy)ethyl]trimethyl ammonium chloride (METAC), [(2-methacryloyloxy)ethyl]dimethyl benzyl ammonium chloride (MEDBAC), or a combination thereof.

The second monomer can comprise a diallyl dialkyl quaternary ammonium salt such as diallyl dimethyl ammonium chloride (DADMAC); an acrylamido alkyl sulfonic acid or a salt thereof such as 2-acrylamido-2-methyl propane sulfonic acid (AMPS) or 2-acrylamido-2-methyl propane sulfonic acid sodium salt (AMPS sodium salt); an acrylic acid such as acrylic acid or methacrylic acid; N-alkylacrylamide such as methacrylamide; a hydroxyalkyl acrylate such as 2-hydroxyethyl methacrylate; or a combination thereof.

Preferably, the second monomer comprises IPMA, MAPTAC, 2-(dimethylamino)ethyl methacrylamide, or a combination thereof. More preferably, the second monomer comprises IPMA, MAPTAC, or a combination thereof.

The molar ratio of second monomer to first monomer from which the polymer is made ranges from about 4:1 to about 19:1, preferably from about 6:1 to about 15:1, more preferably from about 7:1 to about 12:1, and most preferably about 9:1.

The weight average molecular weight of the polymer can be from about 300 Daltons to about 30,000 Daltons, preferably from about 500 Daltons to about 5,000 Daltons, and more preferably from about 500 Daltons to about 2,000 Daltons.

The polymer can be a kinetic hydrate inhibiting polymer. Kinetic hydrate inhibiting polymers prevent formation of hydrate crystals by disrupting crystal growth.

Additionally, a composition is provided for inhibiting gas hydrate formation and/or inhibiting corrosion. The composition comprises the polymer comprised of repeat units of the first monomer and repeat units of the second monomer as described above, and an organic polar solvent, a non-polar solvent, or a combination thereof.

Another composition for inhibiting gas hydrate formation and/or inhibiting corrosion comprises a polymer comprised of repeat units derived from a monomer comprising N-[3-(dibutylamino)propyl]methacrylamide (DBAPAMA) or an alkyl, acetyl, acryloyl or benzyl quaternary salt thereof, N-[3-(diisobutyl)propyl]methacrylamide or an alkyl, acetyl, acryloyl or benzyl quaternary salt thereof, N-[3-(diisopentyl)propyl]methacrylamide or an alkyl, acetyl, acryloyl or benzyl quaternary salt thereof, or a combination thereof, and an organic polar solvent, a non-polar solvent, or a combination thereof.

The composition can comprise from about 0.1 wt. % to about 99.9 wt. %, about 1 wt. % to about 99 wt. %, about 0.1 wt. % to about 75 wt. %, about 0.1 wt. % to about 60 wt. %, about 0.1 wt. % to about 50 wt. %, about 1 wt. % to about 40 wt. %, about 5 wt. % to about 50 wt. %, about 5 wt. % to about 40 wt. %, or about 10 wt. % to about 40 wt. % of the polymer described above.

The amount of the polymer is based on calculating the active amount of polymer in the composition. Thus, when using a 45-95 wt. % solution of a 20-30 wt. % active polymer solution, the amount of the active polymer in the solution is from about 9 wt. % (i.e., 45×20/100) to about 28.5 wt. % (i.e., 95×30/100).

The organic polar solvent can comprise an alcohol, a glycol, a glycol ether, or a combination thereof. Preferably, the organic polar solvent has a molecular weight less than 300 Daltons.

The organic polar solvent can comprise an alcohol, such as 2-ethyl hexanol, methanol, ethanol, isopropanol, n-butanol, t-butanol, pentanol, hexanol, octanol, decanol, dodecanol, tetradecanol, hexadecanol, octadecanol, 1,3-propanediol, or a combination thereof. For example, hydrate inhibitor compositions can be formulated with 2-ethyl hexanol to improve high temperature aqueous solubility, thus, reducing fouling in many systems. Preferably, the alcohol comprises methanol, 2-ethyl hexanol, or a combination thereof. More preferably, the alcohol comprises 2-ethyl hexanol.

The organic polar solvent can comprise a polyhydric alcohol such as a glycol (e.g., ethylene glycol, propylene glycol, 1,3-propanediol), a triol (e.g., glycerol, 1,1,1-tris (hydroxymethyl)propane, tri(ethylene glycol)), or a tetraol (e.g., tetra)ethylene glycol). Preferably, the polyhydric alcohol comprises ethylene glycol.

The organic polar solvent can comprise a glycol ether such as glyme, 2-ethoxyethanol, ethylene diglycol ethyl ether (EDGE) (i.e., diethylene glycol monoethyl ether, di(ethylene glycol) ethyl ether), diethylene glycol dimethyl ether (i.e., diglyme), diethylene glycol monomethyl ether, diethylene glycol monobutyl ether, iso-2-butoxyethanol, 2-isopropoxyethanol, 2-butoxyethanol, ethylene glycol monobutyl ether (EGMBE), diethylene glycol monobutyl ether, propylene glycol butyl ether, triethylene glycol methyl ether, triethylene glycol dimethyl ether, tetraethylene glycol methyl ether, tetraethylene glycol dimethyl ether, or a combination thereof. Preferably, the glycol ether comprises glyme, diglyme, EDGE, EGMBE, triethylene glycol methyl ether, triethylene glycol dimethyl ether, tetraethylene glycol methyl ether, tetraethylene glycol dimethyl ether, or a combination thereof. More preferably, the glycol ether comprises EDGE, EGMBE, or a combination thereof.

Preferably, the organic polar solvent comprises EDGE and 2-ethyl hexanol, EGMBE and 2-ethyl hexanol, or EDGE, EGMBE and 2-ethyl hexanol.

The composition can comprise from about 0.1 wt. % to about 99.9 wt. %, about 25 wt. % to about 99.9 wt. %, about 40 wt. % to about 99.9 wt. %, about 50 wt. % to about 95 wt. %, about 60 wt. % to about 95 wt. %, about 0.1 wt. % to about 75 wt. %, about 0.1 wt. % to about 60 wt. %, about 0.1 wt. % to about 50 wt. %, about 0.1 wt. % to about 40 wt. %, about 0.1 wt. % to about 30 wt. %, about 1 wt. % to about 30 wt. %, about 0.1 wt. % to about 15 wt. %, about 0.1 wt. % to about 12 wt. %, about 0.1 wt. % to about 10 wt. %, about 0.5 wt. % to about 15 wt. %, about 0.5 wt. % to about 12 wt. %, about 0.5 wt. % to about 10 wt. %, about 1 wt. % to about 15 wt. %, about 1 wt. % to about 12 wt. %, about 1 wt. % to about 10 wt. %, about 5 wt. % to about 40 wt. %, about 10 wt. % to about 30 wt. %, or about 15 wt. % to about 25 wt. % organic polar solvent.

The composition can optionally include a non-polar solvent. The non-polar solvent can comprise an aromatic hydrocarbon solvent, an aliphatic hydrocarbon solvent, a cycloaliphatic hydrocarbon solvent, or a combination thereof. The non-polar solvent can comprise, for example, heavy aromatic naphtha, toluene, a xylene, a hexane, a diesel, kerosene, a heptane, an octane, iso-octane, or a combination thereof. The hydrocarbon can slightly reduce the water cut of the wet gas and enable the formation of a small oil cut. For example, the compositions can comprise heavy aromatic naphtha to create a small oil phase thereby improving efficacy for gas hydrate inhibition. Preferably, the nonpolar solvent comprises heavy aromatic naphtha.

If a non-polar solvent is present in the composition, then the composition can comprise from about 5 wt. % to about 55 wt. %, about 5 wt. % to about 50 wt. %, about 10 wt. % to about 55 wt. %, or about 10 wt. % to about 50 wt. % nonpolar solvent.

If the composition includes a non-polar solvent, then the composition can comprise from about 5 wt. % to about 55 wt. % nonpolar solvent; from about 0.1 wt. % to about 15 wt. % polar solvent; and from about 0.1 wt. % to about 50 wt. % of the polymer. Preferably, the composition comprises from 10 wt. % to about 50 wt. % nonpolar solvent; from about 0.1 wt. % to about 10 wt. % polar solvent; and from about 1 wt. % to about 40 wt. % of the polymer.

The composition can include a corrosion inhibitor, an asphaltene inhibitor, a paraffin inhibitor, a scale inhibitor, an emulsifier, a water clarifier, a dispersant, a biocide, a pH modifier, a surfactant, or a combination thereof.

The composition can comprise a corrosion inhibitor in addition to the polymers as described herein. The composition can comprise from about 0.1 to 20 wt. %, 0.1 to 10 wt. %, or 0.1 to 5 wt. % of the one or more additional corrosion inhibitors, based on total weight of the composition. The composition can comprise from 0 to 10 percent by weight of the one or more additional corrosion inhibitors, based on total weight of the composition. The composition can comprise 1.0 wt %, 1.5 wt %, 2.0 wt %, 2.5 wt %, 3.0 wt %, 3.5 wt %, 4.0 wt %, 4.5 wt %, 5.0 wt %, 5.5 wt %, 6.0 wt %, 6.5 wt %, 7.0 wt %, 7.5 wt %, 8.0 wt %, 8.5 wt %, 9.0 wt %, 9.5 wt %, 10.0 wt %, 10.5 wt %, 11.0 wt %, 11.5 wt %, 12.0 wt %, 12.5 wt %, 13.0 wt %, 13.5 wt %, 14.0 wt %, 14.5 wt %, or 15.0 wt % by weight of the one or more additional corrosion inhibitors, based on total weight of the composition. Each system can have its own requirements, and the weight percent of one or more additional corrosion inhibitors in the composition can vary with the system in which it is used.

The one or more additional corrosion inhibitors can comprise an imidazoline compound, a quaternary ammonium compound, a pyridinium compound, or a combination thereof.

The one or more additional corrosion inhibitors can comprise an imidazoline. The imidazoline can be, for example, imidazoline derived from a diamine, such as ethylene diamine (EDA), diethylene triamine (DETA), triethylene tetraamine (TETA) etc. and a long chain fatty acid such as tall oil fatty acid (TOFA). The imidazoline can be an imidazoline of Formula (I) or an imidazoline derivative.

Representative imidazoline derivatives include an imidazolinium compound of Formula (II) or a bis-quaternized compound of Formula (III).

The one or more additional corrosion inhibitors can include an imidazoline of Formula (I):

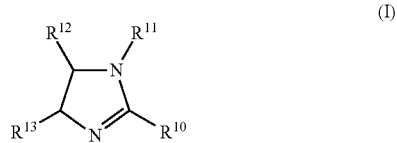

wherein $R^{10}$ is a $C_1$-$C_{20}$ alkyl or a $C_1$-$C_{20}$ alkoxyalkyl group; $R^{11}$ is hydrogen, $C_1$-$C_6$ alkyl, $C_1$-$C_6$ hydroxyalkyl, or $C_1$-$C_6$ arylalkyl; and $R^{12}$ and $R^{13}$ are independently hydrogen or a $C_1$-$C_6$ alkyl group. Preferably, the imidazoline includes an $R^{10}$ which is the alkyl mixture typical in tall oil fatty acid (TOFA), and $R^{11}$, $R^{12}$ and $R^{13}$ are each hydrogen.

The one or more additional corrosion inhibitors can include an imidazolinium compound of Formula (II):

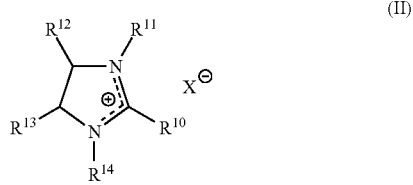

wherein $R^{10}$ is a $C_1$-$C_{20}$ alkyl or a $C_1$-$C_{20}$ alkoxyalkyl group; $R^{11}$ and $R^{14}$ are independently hydrogen, $C_1$-$C_6$ alkyl, $C_1$-$C_6$ hydroxyalkyl, or $C_1$-$C_6$ arylalkyl; $R^{12}$ and $R^{13}$ are independently hydrogen or a $C_1$-$C_6$ alkyl group; and $X^-$ is a halide (such as chloride, bromide, or iodide), carbonate, sulfonate, phosphate, or the anion of an organic carboxylic acid (such as acetate). Preferably, the imidazolinium compound includes 1-benzyl-1-(2-hydroxyethyl)-2-tall-oil-2-imidazolinium chloride.

The one or more additional corrosion inhibitors can comprise a bis-quaternized compound having the formula (III):

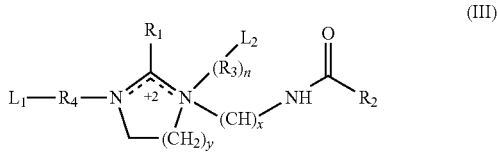

wherein:

$R_1$ and $R_2$ are each independently unsubstituted branched, chain or ring alkyl or alkenyl having from 1 to about 29 carbon atoms; partially or fully oxygenized, sulfurized, and/or phosphorylized branched, chain, or ring alkyl or alkenyl having from 1 to about 29 carbon atoms; or a combination thereof;

$R_3$ and $R_4$ are each independently unsubstituted branched, chain or ring alkylene or alkenylene having from 1 to about 29 carbon atoms; partially or fully oxygenized, sulfurized, and/or phosphorylized branched, chain, or ring alkylene or alkenylene having from 1 to about 29 carbon atoms; or a combination thereof;

$L_1$ and $L_2$ are each independently absent, H, —COOH, —SO$_3$H, —PO$_3$H$_2$, —COOR$_5$, —CONH$_2$, —CONHR$_5$, or —CON(R$_5$)$_2$;

$R_5$ is each independently a branched or unbranched alkyl, aryl, alkylaryl, alkylheteroaryl, cycloalkyl, or heteroaryl group having from 1 to about 10 carbon atoms;

n is 0 or 1, and when n is 0, $L_2$ is absent or H;

x is from 1 to about 10; and y is from 1 to about 5. Preferably, $R_1$ and $R_2$ are each independently $C_6$-$C_{22}$ alkyl, $C_8$-$C_{20}$ alkyl, $C_{12}$-$C_{18}$ alkyl, $C_{16}$-$C_{18}$ alkyl, or a combination thereof; $R_3$ and $R_4$ are $C_1$-$C_{10}$ alkylene, $C_2$-$C_8$ alkylene, $C_2$-$C_6$ alkylene, or $C_2$-$C_3$ alkylene; n is 0 or 1; x is 2; y is 1; $R_3$ and $R_4$ are —$C_2H_2$—; $L_1$ is —COOH, —SO$_3$H, or —PO$_3$H$_2$; and $L_2$ is absent, H, —COOH, —SO$_3$H, or —PO$_3$H$_2$. For example, $R_1$ and $R_2$ can be derived from a mixture of tall oil fatty acids and are predominantly a mixture of $C_{17}H_{33}$ and $C_{17}H_{31}$ or can be $C_{16}$-$C_{18}$ alkyl; $R_3$ and $R_4$ can be $C_2$-$C_3$ alkylene such as —$C_2H_2$—; n is 1 and $L_2$ is —COOH or n is 0 and $L_2$ is absent or H; x is 2; y is 1; $R_3$ and $R_4$ are —$C_2H_2$—; and $L_1$ is —COOH.

It should be appreciated that the number of carbon atoms specified for each group of formula (III) refers to the main chain of carbon atoms and does not include carbon atoms that may be contributed by substituents.

The one or more additional corrosion inhibitors can comprise a bis-quaternized imidazoline compound having the formula (III) wherein $R_1$ and $R_2$ are each independently $C_6$-$C_{22}$ alkyl, $C_8$-$C_{20}$ alkyl, $C_{12}$-$C_{18}$ alkyl, or $C_{16}$-$C_{18}$ alkyl or a combination thereof; $R_4$ is $C_1$-$C_{10}$ alkylene, $C_2$-$C_8$ alkylene, $C_2$-$C_6$ alkylene, or $C_2$-$C_3$ alkylene; x is 2; y is 1; n is 0; $L_1$ is —COOH, —SO$_3$H, or —PO$_3$H$_2$; and $L_2$ is absent or H. Preferably, a bis-quaternized compound has the formula (III) wherein $R_1$ and $R_2$ are each independently $C_{16}$-$C_{18}$ alkyl; $R_4$ is —$C_2H_2$—; x is 2; y is 1; n is 0; $L_1$ is —COOH, —SO$_3$H, or —PO$_3$H$_2$ and $L_2$ is absent or H.

The one or more additional corrosion inhibitors can be a quaternary ammonium compound of Formula (IV):

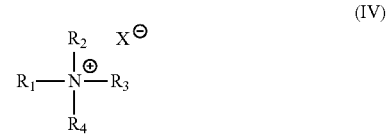

wherein $R_1$, $R_2$, and $R_3$ are independently $C_1$ to $C_{20}$ alkyl, $R_4$ is methyl or benzyl, and $X^-$ is a halide or methosulfate.

Suitable alkyl, hydroxyalkyl, alkylaryl, arylalkyl or aryl amine quaternary salts include those alkylaryl, arylalkyl and aryl amine quaternary salts of the formula [N$^+$R$^{5a}$R$^{6a}$R$^{7a}$R$^{8a}$][X$^-$] wherein $R^{5a}$, $R^{6a}$, $R^{7a}$, and $R^{8a}$ contain one to 18 carbon atoms, and X is Cl, Br or I. For the quaternary salts, $R^{5a}$, $R^{6a}$, $R^{7a}$, and $R^{8a}$ can each be independently alkyl (e.g., $C_1$-$C_{18}$ alkyl), hydroxyalkyl (e.g., $C_1$-$C_{18}$ hydroxyalkyl), or arylalkyl (e.g., benzyl). The mono or polycyclic aromatic amine salt with an alkyl or alkylaryl halide include salts of the formula [N$^+$R$^{5a}$R$^{6a}$R$^{7a}$R$^{8a}$][X$^-$] wherein $R^{5a}$, $R^{6a}$, $R^{7a}$, and $R^{8a}$ contain one to 18 carbon atoms and at least one aryl group, and X is Cl, Br or I.

Suitable quaternary ammonium salts include, but are not limited to, a tetramethyl ammonium salt, a tetraethyl ammonium salt, a tetrapropyl ammonium salt, a tetrabutyl ammonium salt, a tetrahexyl ammonium salt, a tetraoctyl ammonium salt, a benzyltrimethyl ammonium salt, a benzyltriethyl ammonium salt, a phenyltrimethyl ammonium salt, a phenyltriethyl ammonium salt, a cetyl benzyldimethyl ammonium salt, a hexadecyl trimethyl ammonium salt, a dimethyl alkyl benzyl quaternary ammonium salt, a monomethyl dialkyl benzyl quaternary ammonium salt, or a trialkyl benzyl quaternary ammonium salt, wherein the alkyl group has about 6 to about 24 carbon atoms, about 10 and about 18 carbon atoms, or about 12 to about 16 carbon atoms. The quaternary ammonium salt can be a benzyl trialkyl quaternary ammonium salt, a benzyl triethanolamine quaternary ammonium salt, or a benzyl dimethylaminoethanolamine quaternary ammonium salt.

The one or more additional corrosion inhibitors can comprise a pyridinium salt such as those represented by Formula (V):

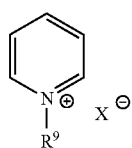

wherein $R^9$ is an alkyl group, an aryl group, or an arylalkyl group, wherein said alkyl groups have from 1 to about 18 carbon atoms and $X^-$ is a halide such as chloride, bromide, or iodide. Among these compounds are alkyl pyridinium salts and alkyl pyridinium benzyl quats. Exemplary compounds include methyl pyridinium chloride, ethyl pyridinium chloride, propyl pyridinium chloride, butyl pyridinium chloride, octyl pyridinium chloride, decyl pyridinium chloride, lauryl pyridinium chloride, cetyl pyridinium chloride, benzyl pyridinium chloride and an alkyl benzyl pyridinium chloride, preferably wherein the alkyl is a $C_1$-$C_6$ hydrocarbyl group. Preferably, the pyridinium compound includes benzyl pyridinium chloride.

The one or more additional corrosion inhibitors can include additional corrosion inhibitors such as phosphate esters, monomeric or oligomeric fatty acids, or alkoxylated amines.

The one or more additional corrosion inhibitors can comprise a phosphate ester. Suitable mono-, di- and tri-alkyl as well as alkylaryl phosphate esters and phosphate esters of mono, di, and triethanolamine typically contain between from 1 to about 18 carbon atoms. Preferred mono-, di- and trialkyl phosphate esters, alkylaryl or arylalkyl phosphate esters are those prepared by reacting a $C_3$-$C_{18}$ aliphatic alcohol with phosphorous pentoxide. The phosphate intermediate interchanges its ester groups with triethylphosphate producing a more broad distribution of alkyl phosphate esters.

Alternatively, the phosphate ester can be made by admixing with an alkyl diester, a mixture of low molecular weight alkyl alcohols or diols. The low molecular weight alkyl alcohols or diols preferably include $C_6$ to $C_{10}$ alcohols or diols. Further, phosphate esters of polyols and their salts containing one or more 2-hydroxyethyl groups, and hydroxylamine phosphate esters obtained by reacting polyphosphoric acid or phosphorus pentoxide with hydroxylamines such as diethanolamine or triethanolamine are preferred.

The one or more additional corrosion inhibitors can include a monomeric or oligomeric fatty acid. Preferred monomeric or oligomeric fatty acids are $C_{14}$-$C_{22}$ saturated and unsaturated fatty acids as well as dimer, trimer and oligomer products obtained by polymerizing one or more of such fatty acids.

The one or more additional corrosion inhibitors can comprise an alkoxylated amine. The alkoxylated amine can be an ethoxylated alkyl amine. The alkoxylated amine can be ethoxylated tallow amine.

The composition can comprise an organic sulfur compound, such as a mercaptoalkyl alcohol, mercaptoacetic acid, thioglycolic acid, 3,3'-dithiodipropionic acid, sodium thiosulfate, thiourea, L-cysteine, tert-butyl mercaptan, sodium thiosulfate, ammonium thiosulfate, sodium thiocyanate, ammonium thiocyanate, sodium metabisulfite, or a combination thereof. Preferably, the mercaptoalkyl alcohol comprises 2-mercaptoethanol. The organic sulfur compound can constitute 0.5 to 15 wt. % of the composition, based on total weight of the composition, preferably about 1 to about 10 wt. % and more preferably about 1 to about 5 wt. %. The organic sulfur compound can constitute 1, 2, 3, 4, 5, 6, 7, 8, 9, 10, 11, 12, 13, 14 or 15 wt. % of the composition.

The composition can further include a demulsifier. Preferably, the demulsifier comprises an oxyalkylate polymer, such as a polyalkylene glycol. The demulsifier can constitute from about 0.1 to 10 wt. %, from about 0.5 to 5 wt. %, or from about 0.5 to 4 wt. of the composition, based on total weight of the composition. The demulsifier can constitute 0.5, 1, 1.5, 2, 2.5, 3, 3.5, 4, 4.5 or 5 wt. % of the composition.

The composition can include an asphaltene inhibitor. The composition can comprise from about 0.1 to 10 wt. %, from about 0.1 to 5 wt. %, or from about 0.5 to 4 wt. % of an asphaltene inhibitor, based on total weight of the composition. Suitable asphaltene inhibitors include, but are not limited to, aliphatic sulfonic acids; alkyl aryl sulfonic acids; aryl sulfonates; lignosulfonates; alkylphenol/aldehyde resins and similar sulfonated resins; polyolefin esters; polyolefin imides; polyolefin esters with alkyl, alkylenephenyl or alkylenepyridyl functional groups; polyolefin amides; polyolefin amides with alkyl, alkylenephenyl or alkylenepyridyl functional groups; polyolefin imides with alkyl, alkylenephenyl or alkylenepyridyl functional groups; alkenyl/vinyl pyrrolidone copolymers; graft polymers of polyolefins with maleic anhydride or vinyl imidazole; hyperbranched polyester amides; polyalkoxylated asphaltenes, amphoteric fatty acids, salts of alkyl succinates, sorbitan monooleate, and polyisobutylene succinic anhydride.

The composition can include a paraffin inhibitor. The composition can comprise from about 0.1 to 10 wt. %, from about 0.1 to 5 wt. %, or from about 0.5 to 4 wt. % of a paraffin inhibitor, based on total weight of the composition. Suitable paraffin inhibitors include, but are not limited to, paraffin crystal modifiers, and dispersant/crystal modifier combinations. Suitable paraffin crystal modifiers include, but are not limited to, alkyl acrylate copolymers, alkyl acrylate vinylpyridine copolymers, ethylene vinyl acetate copolymers, maleic anhydride ester copolymers, branched polyethylenes, naphthalene, anthracene, microcrystalline wax and/or asphaltenes. Suitable paraffin dispersants include, but are not limited to, dodecyl benzene sulfonate, oxyalkylated alkylphenols, and oxyalkylated alkylphenolic resins.

The composition can include a scale inhibitor. The composition can comprise from about 0.1 to 20 wt. %, from about 0.5 to 10 wt. %, or from about 1 to 10 wt. % of a scale inhibitor, based on total weight of the composition. Suitable scale inhibitors include, but are not limited to, phosphates, phosphate esters, phosphoric acids, phosphonates, phosphonic acids, polyacrylamides, salts of acrylamidomethyl propane sulfonate/acrylic acid copolymer (AMPS/AA), phosphinated maleic copolymer (PHOS/MA), and salts of a polymaleic acid/acrylic acid/acrylamidomethyl propane sulfonate terpolymer (PMA/AA/AMPS).

The composition can include an emulsifier. The composition can comprise from about 0.1 to 10 wt. %, from about 0.5 to 5 wt. %, or from about 0.5 to 4 wt. % of an emulsifier, based on total weight of the composition. Suitable emulsifiers include, but are not limited to, salts of carboxylic acids, products of acylation reactions between carboxylic acids or carboxylic anhydrides and amines, and alkyl, acyl and amide derivatives of saccharides (alkyl-saccharide emulsifiers).

The composition can include a water clarifier. The composition can comprise from about 0.1 to 10 wt. %, from about 0.5 to 5 wt. %, or from about 0.5 to 4 wt. % of a water clarifier, based on total weight of the composition. Suitable water clarifiers include, but are not limited to, inorganic metal salts such as alum, aluminum chloride, and aluminum chlorohydrate, or organic polymers such as acrylic acid based polymers, acrylamide based polymers, polymerized amines, alkanolamines, thiocarbamates, and cationic polymers such as diallyldimethylammonium chloride (DADMAC).

The composition can include a dispersant. The composition can comprise from about 0.1 to 10 wt. %, from about 0.5 to 5 wt. %, or from about 0.5 to 4 wt. % of a dispersant, based on total weight of the composition. Suitable dispersants include, but are not limited to, aliphatic phosphonic acids with 2-50 carbons, such as hydroxyethyl diphosphonic acid, and aminoalkyl phosphonic acids, e.g. polyaminomethylene phosphonates with 2-10 N atoms e.g. each bearing at least one methylene phosphonic acid group; examples of the latter are ethylenediamine tetra(methylene phosphonate), diethylenetriamine penta(methylene phosphonate), and the triamine- and tetramine-polymethylene phosphonates with 2-4 methylene groups between each N atom, at least 2 of the numbers of methylene groups in each phosphonate being different. Other suitable dispersion agents include lignin, or derivatives of lignin such as lignosulfonate and naphthalene sulfonic acid and derivatives.

The composition can include an emulsion breaker. The composition can comprise from about 0.1 to 10 wt. %, from about 0.5 to 5 wt. %, or from about 0.5 to 4 wt. % of an emulsion breaker, based on total weight of the composition. Suitable emulsion breakers include, but are not limited to, dodecylbenzylsulfonic acid (DDBSA), the sodium salt of xylenesulfonic acid (NAXSA), epoxylated and propoxylated compounds, anionic, cationic and nonionic surfactants, and resins, such as phenolic and epoxide resins.

The composition can include a hydrogen sulfide scavenger. The composition can comprise from about 1 to 50 wt. %, from about 1 to 40 wt. %, or from about 1 to 30 wt. % of a hydrogen sulfide scavenger, based on total weight of the composition. Suitable additional hydrogen sulfide scavengers include, but are not limited to, oxidants (e.g., inorganic peroxides such as sodium peroxide or chlorine dioxide); aldehydes (e.g., of 1-10 carbons such as formaldehyde, glyoxal, glutaraldehyde, acrolein, or methacrolein; triazines (e.g., monoethanolamine triazine, monomethylamine triazine, and triazines from multiple amines or mixtures thereof); condensation products of secondary or tertiary amines and aldehydes, and condensation products of alkyl alcohols and aldehydes.

The composition can include a gas hydrate inhibitor in addition to the polymers as described herein. The composition can comprise from about 0.1 to 25 wt. %, from about 0.5 to 20 wt. %, or from about 1 to 10 wt. % of an additional gas hydrate inhibitor, based on total weight of the composition. Suitable additional gas hydrate inhibitors include, but are not limited to, thermodynamic hydrate inhibitors (THI), kinetic hydrate inhibitors (KHI), and anti-agglomerates (AA). Suitable thermodynamic hydrate inhibitors include, but are not limited to, sodium chloride, potassium chloride, calcium chloride, magnesium chloride, sodium bromide, formate brines (e.g. potassium formate), polyols (such as glucose, sucrose, fructose, maltose, lactose, gluconate, monoethylene glycol, diethylene glycol, triethylene glycol, mono-propylene glycol, dipropylene glycol, tripropylene glycols, tetrapropylene glycol, monobutylene glycol, dibutylene glycol, tributylene glycol, glycerol, diglycerol, triglycerol, and sugar alcohols (e.g. sorbitol, mannitol)), methanol, propanol, ethanol, glycol ethers (such as diethyleneglycol monomethylether, ethyleneglycol monobutylether), and alkyl or cyclic esters of alcohols (such as ethyl lactate, butyl lactate, methylethyl benzoate).

The composition can include a kinetic hydrate inhibitor. The composition can comprise from about 0.1 to 25 wt. %, from about 0.5 to 20 wt. %, or from about 1 to 10 wt. % of a kinetic hydrate inhibitor, based on total weight of the composition. Suitable kinetic hydrate inhibitors and anti-agglomerates include, but are not limited to, polymers and copolymers, polysaccharides (such as hydroxyethylcellulose (HEC), carboxymethylcellulose (CMC), starch, starch derivatives, and xanthan), lactams (such as polyvinylcaprolactam, polyvinyl lactam), pyrrolidones (such as polyvinyl pyrrolidone of various molecular weights), surfactants (such as fatty acid salts, ethoxylated alcohols, propoxylated alcohols, sorbitan esters, ethoxylated sorbitan esters, polyglycerol esters of fatty acids, alkyl glucosides, alkyl polyglucosides, alkyl sulfates, alkyl sulfonates, alkyl ester sulfonates, alkyl aromatic sulfonates, alkyl betaine, alkyl amido betaines), hydrocarbon based dispersants (such as lignosulfonates, iminodisuccinates, polyaspartates), amino acids, and proteins.

The composition can include a biocide. The composition can comprise from about 0.1 to 10 wt. %, from about 0.5 to 5 wt. %, or from about 0.5 to 4 wt. % of a biocide, based on total weight of the composition. Suitable biocides include, but are not limited to, oxidizing and non-oxidizing biocides. Suitable non-oxidizing biocides include, for example, aldehydes (e.g., formaldehyde, glutaraldehyde, and acrolein), amine-type compounds (e.g., quaternary amine compounds and cocodiamine), halogenated compounds (e.g., 2-bromo-2-nitropropane-3-diol (Bronopol) and 2-2-dibromo-3-nitrilopropionamide (DBNPA)), sulfur compounds (e.g., isothiazolone, carbamates, and metronidazole), and quaternary phosphonium salts (e.g., tetrakis(hydroxymethyl)-phosphonium sulfate (THPS)). Suitable oxidizing biocides include, for example, sodium hypochlorite, trichloroisocyanuric acids, dichloroisocyanuric acid, calcium hypochlorite, lithium hypochlorite, chlorinated hydantoins, stabilized sodium hypobromite, activated sodium bromide, brominated hydantoins, chlorine dioxide, ozone, and peroxides.

The composition can include a pH modifier. The composition can comprise from about 0.1 to 20 wt. %, from about 0.5 to 10 wt. %, or from about 0.5 to 5 wt. % of a pH modifier, based on total weight of the composition. Suitable pH modifiers include, but are not limited to, alkali hydroxides, alkali carbonates, alkali bicarbonates, alkaline earth metal hydroxides, alkaline earth metal carbonates, alkaline earth metal bicarbonates and mixtures or combinations thereof. Exemplary pH modifiers include sodium hydroxide, potassium hydroxide, calcium hydroxide, calcium oxide, sodium carbonate, potassium carbonate, sodium bicarbonate, potassium bicarbonate, magnesium oxide, and magnesium hydroxide.

The composition can include a surfactant. The composition can comprise from about 0.1 to 10 wt. %, from about 0.5 to 5 wt. %, or from about 0.5 to 4 wt. % of a surfactant, based on total weight of the composition. Suitable surfactants include, but are not limited to, anionic surfactants and nonionic surfactants. Anionic surfactants include alkyl aryl sulfonates, olefin sulfonates, paraffin sulfonates, alcohol sulfates, alcohol ether sulfates, alkyl carboxylates and alkyl ether carboxylates, and alkyl and ethoxylated alkyl phosphate esters, and mono and dialkyl sulfosuccinates and sulfosuccinamates. Nonionic surfactants include alcohol alkoxylates, alkylphenol alkoxylates, block copolymers of ethylene, propylene and butylene oxides, alkyl dimethyl amine oxides, alkyl-bis(2-hydroxyethyl) amine oxides, alkyl amidopropyl dimethyl amine oxides, alkylamidopropyl-bis (2-hydroxyethyl) amine oxides, alkyl polyglucosides, polyalkoxylated glycerides, sorbitan esters and polyalkoxylated sorbitan esters, and alkoyl polyethylene glycol esters and diesters. Also included are betaines and sultanes, amphoteric surfactants such as alkyl amphoacetates and amphodiacetates, alkyl amphopropionates and amphodipropionates, and alkyliminodipropionate.

The gas hydrate inhibitor or corrosion inhibitor compositions can further include additional functional agents or additives that provide a beneficial property. For example, additional agents or additives can be sequestrants, solubilizers, lubricants, buffers, cleaning agents, rinse aids, preservatives, binders, thickeners or other viscosity modifiers, processing aids, carriers, water-conditioning agents, foam inhibitors or foam generators, threshold agents or systems, aesthetic enhancing agents (i.e., dyes, odorants, perfumes), or other additives suitable for formulation with a corrosion inhibitor composition, and mixtures thereof. Additional agents or additives will vary according to the particular corrosion inhibitor composition being manufactured and its intend use as one skilled in the art will appreciate.

Alternatively, the compositions can not contain any of the additional agents or additives.

Additionally, the gas hydrate inhibitors or corrosion inhibitors can be formulated into compositions comprising the following components. These formulations can include the ranges of the components listed in the table below and can optionally include additional agents.

| Component | 1 | 2 | 3 | 4 | 5 | 6 | 7 | 8 | 9 | 10 | 11 | 12 |
|---|---|---|---|---|---|---|---|---|---|---|---|---|
| Polymer as described herein | 10-98.2 | 60-99 | 30-98.3 | 80-98.4 | 35-98.4 | 45-99 | 10-40 | 60-98.3 | 30-40 | 85-98.5 | 95-99.5 | 5-89.7 |
| Organic polar solvent | 0.1-50 | — | 0.1-50 | — | 0.1-50 | 0.1-50 | 0.1-50 | — | 0.1-50 | — | — | 10-35 |
| Additional corrosion inhibitor | 0.1-20 | 0.1-20 | — | — | — | — | 0.1-20 | 0.1-20 | — | — | — | 0.1-20 |
| Asphaltene inhibitor | 0.1-5 | 0.1-5 | 0.1-5 | 0.1-5 | — | — | 0.1-5 | 0.1-5 | 0.1-5 | — | — | 0.1-5 |
| Scale inhibitor | 1-10 | 1-10 | 1-10 | 1-10 | 1-10 | — | 1-10 | 1-10 | 1-10 | 1-10 | — | 1-10 |
| Additional gas hydrate inhibitor | — | — | — | — | — | — | — | — | — | — | — | 0.1-25 |
| Biocide | 0.5-5 | 0.5-5 | 0.5-5 | 0.5-5 | 0.5-5 | 0.5-5 | 0.5-5 | 0.5-5 | 0.5-5 | 0.5-5 | 0.5-5 | |

| Component | 13 | 14 | 15 | 16 | 17 | 18 | 19 | 20 | 21 | 22 | 23 | 24 |
|---|---|---|---|---|---|---|---|---|---|---|---|---|
| Polymer as described herein | 40-98.7 | 15-97.8 | 55-99.8 | 50-99 | 40-97.9 | 75-99.4 | 5-40 | 40-98.3 | 45-99.3 | 10-40 | 25-40 | 70-98.9 |
| Organic polar solvent | — | 1-30 | — | 1-30 | 1-30 | — | 1-30 | — | — | 1-30 | 1-30 | — |
| Additional corrosion inhibitor | 0.1-20 | 0.1-20 | 0.1-20 | 0.1-20 | 0.1-20 | 0.1-20 | 0.1-20 | 0.1-20 | 0.1-20 | 0.1-20 | 0.1-20 | 0.1-20 |
| Asphaltene inhibitor | 0.1-5 | — | — | — | — | — | 0.1-5 | — | — | — | — | — |
| Scale inhibitor | 1-10 | 1-10 | — | — | 1-10 | — | 1-10 | 1-10 | — | — | — | 1-10 |
| Additional gas hydrate inhibitor | 0.1-25 | 0.1-25 | 0.1-25 | — | — | — | 0.1-25 | 0.1-25 | 0.1-25 | — | 0.1-25 | — |
| Biocide | — | — | — | — | — | 0.5-5 | 0.5-5 | 0.5-5 | 0.5-5 | 0.5-5 | — | — |

Additionally, a method is provided for inhibiting hydrate formation in a fluid comprising water, a gas, and optionally a liquid hydrocarbon. The method comprises contacting the fluid with an effective hydrate-inhibiting amount of any of the polymers as described herein or any composition described herein.

The fluid comprising water and a gas can be substantially free of a liquid hydrocarbon before contacting the polymer or the composition. The fluid is substantially free of a liquid hydrocarbon when the fluid has a concentration of liquid hydrocarbon of less than about 0.5 wt. %, 0.4 wt. %, 0.3 wt. %, 0.2 wt. %, 0.1 wt. %, 0.05 wt. %, or 0.01 wt. %.

The gas can be a hydrocarbon gas. In particular, the hydrocarbon gas can comprise methane, ethane, propane, n-butane, isobutane, isopentane, or a combination thereof.

A method for inhibiting corrosion at a surface is also provided. The method comprises adding the polymer or the composition to a fluid which contacts a surface of a wellbore or equipment used in production, processing, transportation, storage or separation of the fluid to inhibit corrosion on the surface. The fluid comprises a hydrocarbon such as natural gas or a liquid hydrocarbon.

The polymers or compositions as described herein can be used for inhibiting corrosion in oil and gas applications. The polymers or compositions can be used in any industry where it is desirable to inhibit corrosion on a surface.

The method comprises contacting any of the polymers or compositions described herein with a metal surface to reduce, inhibit or prevent corrosion on the metal surface.

The polymers or compositions can be used for inhibiting corrosion by treating a gas or liquid stream with an effective amount of the polymer or the composition as described herein.

The corrosion inhibitor polymers or compositions can be used in water systems, condensate/oil systems/gas systems, or any combination thereof. For example, the polymers or compositions can be used in controlling scale on heat exchanger surfaces.

The polymers or compositions can be applied to a gas or liquid produced, or used in the production, transportation, storage, and/or separation of crude oil or natural gas.

The polymers or compositions can be applied to a gas stream used or produced in a coal-fired process, such as a coal-fired power plant.

The polymers or compositions can be applied to a gas or liquid produced or used in a waste-water process, a farm, a slaughter house, a land-fill, a municipality waste-water plant, a coking coal process, or a biofuel process.

A fluid to which the polymers and compositions can be introduced can be an aqueous medium. The aqueous medium can comprise water, gas, and optionally liquid hydrocarbon.

A fluid to which the polymers or compositions can be introduced can be a liquid hydrocarbon. The liquid hydrocarbon can be any type of liquid hydrocarbon including, but not limited to, crude oil, heavy oil, processed residual oil, bituminous oil, coker oils, coker gas oils, fluid catalytic cracker feeds, gas oil, naphtha, fluid catalytic cracking slurry, diesel fuel, fuel oil, jet fuel, gasoline, and kerosene.

The fluid can be a refined hydrocarbon product.

A fluid treated with the polymer or composition can be at any selected temperature, such as ambient temperature or an elevated temperature. The fluid (e.g., liquid hydrocarbon) can be at a temperature of from about 40° C. to about 250° C. The fluid can be at a temperature of from −50° C. to 300° C., 0° C. to 200° C., 10° C. to 100° C., or 20° C. to 90° C. The fluid can be at a temperature of −20° C., −15° C., −10° C., −5° C., or 0° C. The fluid can be found in an arctic environment, and can have a temperature and salinity typical of such environment.

The polymers or compositions can be added to a fluid at various levels of water cut. For example, the water cut can be from 0% to 100% volume/volume (v/v), from 1% to 80% v/v, or from 1% to 60% v/v. The fluid can be an aqueous medium that contains various levels of salinity. The fluid can have a salinity of 0% to 25%, about 1% to 24%, or about 10% to 25% weight/weight (w/w) total dissolved solids (TDS).

The polymers or compositions can be applied to a fluid to provide any selected concentration. In practice, the polymers or compositions are typically added to a flow line to provide an effective treating dose of the described polymers or compositions from about 0.01 to about 5,000 ppm. The polymers or compositions can be applied to a fluid to provide at a concentration of about 1 parts per million (ppm) to about 1,000,000 ppm, about 1 parts per million (ppm) to about 100,000 ppm, or about 10 ppm to about 75,000 ppm. The polymers or compositions can be applied to a fluid at a concentration of about 100 ppm to about 10,000 ppm, about 200 ppm to about 8,000 ppm, or about 500 ppm to about 6,000 ppm. The polymers or compositions can be applied to a fluid to provide a concentration of 10 ppm, 20 ppm, 100 ppm, 200 ppm, 500 ppm, or 1,000 ppm. Each system can have its own requirements, and the effective amount of a polymer or composition to sufficiently reduce the rate of corrosion can vary with the system in which it is used.

The polymers or compositions can be applied continuously, in batch, or a combination thereof. Dosage rates for continuous treatments typically range from about 10 to about 500 ppm, or about 10 to about 200 ppm. Dosage rates for batch treatments typically range from about 10 to about 400,000 ppm, or about 10 to about 20,000 ppm. The polymer or composition can also be applied as a pill to a pipeline, for example, to provide a high dose (e.g., 20,000 ppm) of the polymer or composition.

The composition is added into the mixture of hydrocarbons and water at any concentration effective to inhibit the formation of gas hydrate agglomerates under the given conditions. The effective amount of the polymer or the composition for hydrate inhibition is from about 0.1 volume % to about 10 volume % based on the total volume of produced water in the fluid comprising gas or liquid hydrocarbon and water, preferably from about 0.1 volume % to about 5 volume %, and more preferably from about 0.5 volume % to about 3 volume %. Typically, the amount of produced water is based on the amount of produced water per day that is calculated from the average volume of production per day for a particular well. The effective amount of the composition can be provided to the system in one or more doses.

The methods can involve contacting a liquid hydrocarbon and water mixture or a gas and water mixture with a polymer or composition as described herein. When an effective amount of the polymer or composition is used, gas hydrate formation and/or corrosion are inhibited. In the absence of such an effective amount, gas hydrate formation and/or corrosion are not inhibited.

There are a number of factors that can be taken into account in determining the effective amount of the polymer or composition, including, but not necessarily limited to, the proportion of water in the fluid, the nature of the gas or liquid hydrocarbon, the nature of the hydrate-forming guest molecules, the temperature and pressure conditions that the mixture of gas and water are subject to, the particular polymer or composition employed, etc. Routine experimentation with a particular set of conditions and/or in a specific system can determine the optimum dosage range to avoid the formation of problematic quantities of irreversible, harmful gas hydrate masses. For example, when considering the appropriate dose or whether additional doses of the polymer or composition are needed, the temperature, pressure, brine composition, brine volume, oil composition, oil volume, and gas composition can be considered for a particular system to determine the effective amount of the polymer or composition to inhibit gas hydrate agglomeration or corrosion under the conditions present for the particular system to be treated.

The total time of gas hydrate inhibition will be dependent on oil field conditions and the number of applications. The gas hydrate formation can be inhibited for at least 144, 150, 160, 170, 180, 190, 200, 210, 220, 230, 240, 250, 260, 270, 280, 290, 300, 310, 320, 330, 340, 350, 360, 370, 380, 390, 400, 410, 420, 430, 440, 450, 460, 470, 480, 490. 500. 510, 520. 530, 540, 550, 560, 570, 580, 590, 600, 610, 620, 630, 640, 650, 660, 670, 680, 690, 700, 710, or 720 hours. Preferably, the gas hydrate formation can be inhibited for from about 144 hours to about 480 hours, about 144 hours to about 432 hours, about 144 hours to about 384 hours, about 144 hours to about 336 hours, about 144 hours to about 288 hours, about 144 hours to about 240 hours, or about 144 hours to about 192 hours.

The hydrate inhibitor compositions are chemically compatible with various elastomers and metals. Elastomers screened for compatibility can include Neoprene (i.e., polychloroprene), Hypalon® (chlorosulfonated polyethylene synthetic rubber), nitrile butadiene rubber (NBR), ethylene propylene rubber (EPR), Teflon® (polytetrafluoroethylene), Kalrez® (perfluoro hydrocarbon elastomer), high density polyethylene (HDPE), Nylon 11 (polyamide bioplastic), polyether ether ketone (PEEK), ethylene propylene diene rubber (EPDM White), hydrogenated nitrile butadiene rubber (HNBR), Viton® A (perfluoro hydrocarbon elastomer), Viton® B (perfluoro hydrocarbon elastomer), and Chemraz® (perfluoro hydrocarbon elastomer). Metals screened for compatibility can include AISI 1018 carbon steel, Inconel® 625 nickel-chromium alloy, SS2507 stainless steel, copper, SS2205 stainless steel, Hastelloy C-276® (nickel-molybdenum-chromium alloy), SS304L stainless steel, and SS316L stainless steel. The elastomers and metals are screened for compatibility at the effective amount used in the system as described above. The compositions and compounds are chemically compatible with metals when they do not cause corrosion to occur to the stainless steel and mild carbon steel components of the system and are chemically compatible with elastomers when they do not cause mass change or swelling.

The polymers or compositions preferably do not interfere or react with any corrosion inhibitor, scale inhibitor, or other production chemical additives that are used in the system.

Advantageously, the polymers or compositions do not form emulsions or foams when stored or upon use in a system. Emulsion formation can cause water quality issues in disposal of the produced water and foaming of the produced liquid can cause handling and system upset problems.

The compositions can also reduce friction or drag when fluids are transported. Thus, these compositions can act as drag reducers or friction reducers when added to the hydrocarbon fluids.

The methods are useful for inhibiting hydrate formation for many hydrocarbons and hydrocarbon mixtures. The methods are particularly useful for lighter or low-boiling, $C_1$-$C_5$ hydrocarbon gases or gas mixtures at ambient conditions. Non-limiting example of such gases include methane, ethane, propane, n-butane, isobutane, isopentane and mixtures thereof. Other examples include various natural gas mixtures that are present in many gas and/or oil formations and natural gas liquids. The hydrates of all these low-boiling hydrocarbons are also referred to as gas hydrates. The hydrocarbons may also comprise other compounds including, but not limited to, carbon dioxide, hydrogen sulfide, and other compounds commonly found in gas/oil formations or processing plants, either naturally occurring and/or used in recovering/processing hydrocarbons from the formation, and mixtures thereof.

The methods can be used at any pressure that allows formation of hydrocarbon gas hydrates. When the hydrocarbons in the mixture are lower boiling hydrocarbons or hydrocarbon gases at ambient conditions, the pressure is usually at or greater than atmospheric pressure (i.e. about 101 kPa), preferably greater than about 1 MPa, and more preferably greater than about 5 MPa. The pressure in certain formation or processing units or plants could be much higher, such as greater than about 20 MPa. There is no specific high-pressure limit.

The temperature for contacting the mixture with the hydrate inhibitor composition is usually approximately at or below ambient or room temperature. Lower temperatures tend to favor gas hydrate formation. At much higher temperatures, gas hydrates are less likely to form.

The compositions can include other means of gas hydrate inhibition, such as thermodynamic hydrate inhibitors and anti-agglomerant hydrate inhibitors. If mixtures of gas hydrate inhibitors are used, the mixture can be added to gas and water mixture through a single port or multiple ports. Alternatively, individual gas hydrate inhibitors can be added to separate ports to access the gas and water mixture.

To ensure effective inhibition of formation of gas hydrates, the hydrate inhibitor composition should be injected prior to formation of gas hydrate crystals. The composition can be injected at the wellhead, at subsea, in a riser, or a flow line. Typically, the hydrate inhibitor composition is injected at the wellhead or below the wellhead. The treatment can also be used for pipelines or anywhere in the system where there is a potential for gas hydrate formation.

The composition is introduced into the fluid by any means suitable for ensuring dispersal of the hydrate inhibitor composition through the fluid being treated. Typically the hydrate inhibitor composition is injected using mechanical equipment such as chemical injection pumps, piping tees, injection fittings, and the like. The compositions can be pumped into the oil/gas pipeline by using an umbilical line. Also, capillary injection systems can be used to deliver the compositions. U.S. Pat. No. 7,311,144 provides a description of an apparatus and methods relating to capillary injection, which is herein incorporated by reference.

The contacting may be achieved in a number of ways, including mixing, blending with mechanical mixing equipment or devices, stationary mixing setup or equipment, magnetic mixing or other suitable methods, other equipment and means known to one skilled in the art and combinations thereof to provide adequate contact and/or dispersion of the hydrate inhibitor composition into the mixture. The contacting can be made in-line and/or offline. The various components of the composition may be mixed prior to and/or during contact. If needed or desired, the composition or some of its components can be optionally removed or separated mechanically, chemically, or by other methods known to one skilled in the art, or by a combination of these methods after the gas hydrate formation conditions are no longer present.

The fluid in which the polymers or compositions are introduced can be contained in and/or exposed to many different types of apparatuses. For example, the fluid can be contained in an apparatus that transports fluid from one point to another, such as an oil and/or gas pipeline. The apparatus can be part of an oil and/or gas refinery, such as a pipeline, a separation vessel, a dehydration unit, or a gas line. The polymers or compositions can be introduced to large diameter flow lines of from about 1 inch to about 4 feet in diameter, small gathering lines, small flow lines and headers. The fluid can be contained in and/or exposed to an apparatus used in oil extraction and/or production, such as a wellhead. The apparatus can be part of a coal-fired power plant. The apparatus can be a scrubber (e.g., a wet flue gas desulfurizer, a spray dry absorber, a dry sorbent injector, a spray tower, a contact or bubble tower, or the like). The apparatus can be a cargo vessel, a storage vessel, a holding tank, or a pipeline connecting the tanks, vessels, or processing units.

The surface can be a metal surface, such as carbon steel conduit or pipeline or mild steel conduit or pipeline.

The polymers or compositions can be introduced into a fluid by any appropriate method for ensuring dispersal through the fluid.

The polymer or composition can be added to the fluid before the fluid contacts the surface.

The polymer or composition can be added at a point in a flow line upstream from the point at which corrosion prevention or hydrate inhibition is desired.

The polymers or compositions can be injected using mechanical equipment such as chemical injection pumps, piping tees, injection fittings, atomizers, quills, and the like.

The polymers or compositions can be pumped into an oil and/or gas pipeline using an umbilical line. A capillary injection system can be used to deliver the compositions to a selected fluid.

The polymers or compositions can be introduced into a liquid and mixed.

The polymers or compositions can be injected into a gas stream as an aqueous or non-aqueous solution, mixture, or slurry.

The fluid can be passed through an absorption tower comprising the polymer or composition.

The flow rate of a flow line in which the polymer or composition is used can be between 0 and 100 feet per second, or between 0.1 and 50 feet per second. The polymers or compositions can be formulated with water in order to facilitate addition to the flow line.

The hydrate inhibitor polymers can be synthesized by any means known in the art, such as, for example free radical polymerization. For example, representative polymers can be prepared by the free radical polymerization of a first monomer and a second monomer. Synthesis of such polymers is known in the art and described, for example, in U.S. Pat. No. 8,921,478.

Typically, the hydrate inhibiting polymer can be prepared by combining one or more vinyl monomers (e.g., monomers described as the first monomer and second monomer herein) in an organic polar solvent followed by stirring and maintaining the reacting mixture to about room temperature to about 150° C. for about 1 hour to about 24 hours, preferably at about 50 to about 100° C. for about 2 hours to about 6 hours, and more preferably at about 60 to about 80° C. for about 2 hours to about 4 hours. During this time, an initiator (e.g., t-butyl peroctoate) is added to the reaction mixture. Reaction temperature and reaction time can be optimized based on the selection of initiator as is well known in the art.

Suitable free radical initiators include, but are not limited to, benzoates, di-azo compounds, and peroxides. Representative free radical initiators include, for example, tert-amyl peroxybenzoate, 4,4-azobis(4-cyanovaleric acid), 1'-azobis (cyclohexanecarbonitrile), 2,2'-azobisisobutyronitrile (AIBN), benzoyl peroxide, 2,2-bis(tert-butylperoxy)butane, 1,1-bis(tert-butylperoxy)cyclohexane, 2,5-bis(tert-butylperoxy)-2,5-dimethylhexane, 2,5-bis(tert-Butylperoxy)-2,5-dimethyl-3-hexyne, bis(1-(tert-butylperoxy)-1-methylethyl) benzene, 1,1-bis(tert-butylperoxy)-3,3,5-trimethylcyclohexane, tert-butyl hydroperoxide, tert-butyl peracetate, tert-butyl peroctoate, tert-butyl peroxide, tert-butyl peroxybenzoate, tert-butylperoxy isopropyl carbonate, cumene hydroperoxide, cyclohexanone peroxide, dicumyl peroxide, lauroyl peroxide, 2,4-pentanedione peroxide, peracetic acid, potassium persulfate, and sodium persulfate. Tert-butyl peroctoate and peroxide-based initiators are preferred.

The molar ratio of second monomer to initiator ranges from about 0.1 to about 50 mol % (i.e., about 1000:1 to about 2:1), from about 5 to about 50 mol % (i.e., about 20:1 to about 2:1), or from about 15 to about 50 mol % (i.e., about 6.67:1 to about 2:1).

As described herein, a "polymer" can be a macromolecule having at least 20 repeat units, an oligomer having from 5-19 repeat units, or a dendrimer (i.e., a macromolecule having a central core, dendritic structures (i.e., branches), and functional surface groups).

Unless otherwise indicated, an "alkyl" group as described herein alone or as part of another group is an optionally substituted linear saturated monovalent hydrocarbon substituent containing from one to sixty carbon atoms and preferably one to thirty carbon atoms in the main chain or eight to thirty carbon atoms in the main chain, or an optionally substituted branched saturated monovalent hydrocarbon substituent containing three to sixty carbon atoms, and preferably eight to thirty carbon atoms in the main chain. Examples of unsubstituted alkyl groups include methyl, ethyl, n-propyl, i-propyl, n-butyl, i-butyl, s-butyl, t-butyl, n-pentyl, i-pentyl, s-pentyl, t-pentyl, and the like.

The terms "aryl" or "ar" as used herein alone or as part of another group (e.g., aralkyl) denote optionally substituted homocyclic aromatic groups, preferably monocyclic or bicyclic groups containing from 6 to 12 carbons in the ring portion, such as phenyl, biphenyl, naphthyl, substituted phenyl, substituted biphenyl or substituted naphthyl. Phenyl and substituted phenyl are the more preferred aryl. The term "aryl" also includes heteroaryl.

The term "hydrocarbon" as used herein describes a compound or substituent consisting exclusively of the elements carbon and hydrogen.

The term "substituted" as in "substituted aryl," "substituted alkyl," and the like, means that in the group in question (i.e., the alkyl, aryl or other group that follows the term), at least one hydrogen atom bound to a carbon atom is replaced with one or more substituent groups such as hydroxy (—OH), alkylthio, phosphino, amido (—CON($R_A$)($R_B$), wherein $R_A$ and $R_B$ are independently hydrogen, alkyl, or aryl), amino(—N($R_A$)($R_B$), wherein $R_A$ and $R_B$ are independently hydrogen, alkyl, or aryl), halo (fluoro, chloro, bromo, or iodo), silyl, nitro (—$NO_2$), an ether (—$OR_A$ wherein $R_A$ is alkyl or aryl), an ester (—OC(O)$R_A$ wherein $R_A$ is alkyl or aryl), keto (—C(O)$R_A$ wherein $R_A$ is alkyl or aryl), heterocyclo, and the like. When the term "substituted" introduces a list of possible substituted groups, it is intended that the term apply to every member of that group. That is, the phrase "optionally substituted alkyl or aryl" is to be interpreted as "optionally substituted alkyl or optionally substituted aryl."

"Arylalkyl" means an aryl group attached to the parent molecule through an alkylene group. The number of carbon atoms in the aryl group and the alkylene group is selected such that there is a total of about 6 to about 18 carbon atoms in the arylalkyl group. A preferred arylalkyl group is benzyl.

"Inhibiting" includes both inhibiting and preventing the formation and agglomeration of hydrate crystals or both inhibiting and preventing the formation of corrosion.

Having described the invention in detail, it will be apparent that modifications and variations are possible without departing from the scope of the invention defined in the appended claims.

EXAMPLES

The following non-limiting examples are provided to further illustrate the invention.

Example 1: Synthesis of DBAPAMA Monomer

A solution of methacryloyl chloride (97%, 12.5 mL, 127.9 mmol) was made in 150 mL dichloromethane solvent and stirred in a 500 mL round bottom flask. To this was slowly charged 150 mL of a 1.8 M potassium hydroxide solution (274 mmol). The aqueous layer was biphasic and constituted the top layer. Flask and contents were chilled with ice to ~0° C. To this flask was added dibutylaminopropylamine (DBAPA, ~100%, 21.676 g, 116.3 mmol) via syringe directly to the DCM layer very slowly. The evolution of HCl gas was mediated via nitrogen stream and the potassium hydroxide aqueous layer scavenger. Once the exotherm had slowed, stirring was increased until the flask returned to room temperature. The mixture was separated in a separatory funnel (discarding the aqueous layer) and dried by passage through excess sodium sulfate and subsequent filtration. The dichloromethane was removed via rotary evaporation, yielding a thick very light yellow/clear oil.

Example 2: Synthesis of DBAPAMA Homopolymer

DBAPAMA monomer (4.367 g, 17.17 mmol, 21.8 polymer wt. %), and ethylene glycol monobutylether solvent (15.289 g, 17.0 mL) were combined, stirred, and heated to 105° C. in a capped vial which was vented to the atmosphere with a needle. The vial cap was removed and t-butyl peroctanoate (225 uL+165 uL, total 1.60 mmol, total 1.73 polymer wt. %) was added in two portions, one at 105° C. initial time, and again 60 minutes later. Total polymer solids in solution was 20.0%. After reaction was allowed to proceed, the temperature was decreased to 95° C. and allowed to continue for another 2 hours, after which the vial was allowed to cool to room temperature.

Example 3: Synthesis of DBAPAMA-IPMA Polymer

A solution of N-isopropyl methacrylamide (2.872 g, 22.58 mmol, 14.28 polymer wt. %), a 99 wt. % active aqueous DBAPAMA solution (0.567 g, 2.23 mmol, 2.82 polymer wt. %), and ethylene diglycol ethyl ether solvent (15.83 g, 18.8 mL) were combined, stirred, and heated to 105° C. in a capped vial which was vented to the atmosphere with a needle. During heating, the vial cap was removed and t-butyl peroctanoate (0.84 g, 3.88 mmol, 4.2 polymer wt. %) was added. After heating for 4 hours, the vial was allowed to cool to room temperature.

Example 4: Synthesis of DBAPAMA-MAPTAC Polymer

A 50.0 wt. % active aqueous methacrylamidopropyl trimethylammonium chloride solution (1.096 g, 2.48 mmol, 2.8 polymer wt. %), a 99 wt. % active aqueous DBAPAMA solution (2.597 g, 10.2 mmol, 13.4 polymer wt. %), and ethylene diglycol ethyl ether solvent (15.555 g, 18.47 mL) were combined, stirred, and heated to 105° C. in a capped vial which was vented to the atmosphere with a needle. During heating, the vial cap was removed and t-butyl peroctanoate (0.752 g, 3.47 mmol, 3.87 polymer wt. %) was added. After heating for 4 hours, the vial was allowed to cool to room temperature.

Example 5: Rocking Cell Tests

The rocking cell equipment consists of a rack of stainless steel cells mounted on a central axle immersed in a temperature-controlled bath. The bath temperature is moderated by a circulating chiller which is controlled by the integral computer. To rock the cells, the central axle is rotated by a computer-controlled stepper motor, which can rotate the cells up to 45° in each direction (that is, a 90° total rocking angle) at rocking rates of up to 20 times a minute. High-shear agitation of the fluids inside the cell is provided by the movement of a mixing ball (usually stainless steel although glass balls are also available) as the cells move. Each cell has a total volume of around 40 mL and will be filled with about 15 mL liquid which would give a gas:liquid ratio of ~1.7:1. Tests can also be performed to replicate the gas:liquid ratio of the autoclave or of the field.

Specifically, the test includes filling the cells with brine containing 1,000 ppm NaCl, 500 ppm acetic acid, and 250 ppm formic acid (11.6 mL), and a 1.50-1.75 volume % of the DBAPAMA-IPMA polymer of Example 3, or comparative commercial polymers. The cell was then flushed with a synthetic test gas, described in Table 2, at atmospheric pressure to displace the air. Following flushing, the cell was pressurized with a synthetic gas to 140 bar (2,030 psi) at 24° C. During the pressurization process, the pressure was monitored for any decreases, i.e., dissolution of the gas into the liquid, and if a decrease in pressure was detected, gas was added to maintain a constant pressure of 140 bar. After a constant pressure of 140 bar was achieved in the cells, the cells were isolated from the pressure source to create an isochoric process. The bath was cooled to about 15° C. over 120 minutes. Once the desired temperature was achieved, the cells were rocked for 12 hours. After 12 hours, the temperature was decreased to about 12.8° C. and the cells were rocked for 12 hours. After 12 hours, the temperature was decreased to 10° C. and the cells were rocked for 12 hours. After 12 hours, the temperature was decreased to about 7.2° C. and the cells were rocked for 12 hours. After 12 hours, the temperature was decreased to about 4.4° C. and the cells were rocked until failure, or 10 days maximum.

The KHI performance tests were conducted with the sweet gas composition listed in Table 2, below. Tests were conducted at 50% water cut (WC) and at 100% water cut.

TABLE 2

| Test Gas Compositions | |
|---|---|
| Component | Synthetic Test Gas (mol %) |
| $N_2$ | 8.47 |
| $CO_2$ | 11.34 |
| Methane | 78.64 |
| Ethane | 1.28 |
| Propane | 0.20 |
| n-Butane | 0.11 |
| Total | 100.0 |

The pass/fail criteria are based on the ability of a KHI to inhibit hydrate formation at a particular temperature. Hydrate formation is indicated by a drop in pressure in the cell of ≥2.9 psi. If hydrate formation occurred in the cell prior during the hold time at a particular temperature, then the polymer was considered to exhibit a failure temperature at the hold time at which pressure drop occurred. The amount of time the KHI was able to inhibit hydrate formation is identified as the hold time. The results are shown in the table below as compared to comparative compositions A through D, which are commercially available products considered to be very effective for inhibiting hydrate formation.

| | 50% WC | | 100% WC | |
|---|---|---|---|---|
| Polymer Tested | Failure Temp. (° C.) | Hold Time (hr) | Failure Temp. (° C.) | Hold Time (hr) |
| DBAPAMA-IPMA of Example 3 | 40 | 61 | 40 | 62 |
| DBAPAMA-IPMA of Example 3 | 40 | 61 | 40 | 62 |
| Comparative A (vinyl KHI polymer) | 40 | 50 | 45 | 43 |

-continued

| Polymer Tested | 50% WC | | 100% WC | |
|---|---|---|---|---|
| | Failure Temp. (° C.) | Hold Time (hr) | Failure Temp. (° C.) | Hold Time (hr) |
| Comparative A | 40 | 50 | 40 | 50 |
| Comparative B (vinyl KHI polymer) | 40 | 57 | 40 | 72 |
| Comparative B | 40 | 60 | 40 | 68 |
| Comparative C (vinyl lactam polymer) | 50 | 30 | 40 | 59 |
| Comparative C | 50 | 30 | 40 | 68 |
| Comparative D (methacrylamide copolymer) | 40 | 57 | 40 | 57 |
| Comparative D | 40 | 57 | 40 | 57 |

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above products and methods without departing from the scope of the invention, it is intended that all matter contained in the above description shall be interpreted as illustrative and not in a limiting sense.

What is claimed is:

1. A polymer comprising:
   repeat units derived from a first monomer comprising N-[3-(dibutylamino)propyl]methacrylamide (DBAPAMA) or an alkyl, acetyl, acryloyl or benzyl quaternary salt thereof, N-[3-(diisobutyl)propyl]methacrylamide or an alkyl, acetyl, acryloyl or benzyl quaternary salt thereof, N-[3-(diisopentyl)propyl]methacrylamide or an alkyl, acetyl, acryloyl or benzyl quaternary salt thereof, or a combination thereof; and
   repeat units derived from a second monomer comprising acrylamide, N-alkylacrylamide, N-alkyl (alkyl)acrylamide, ((dialkylamino)alkyl)acrylamide or an alkyl or benzyl quaternary salt thereof, ((dialkylamino)alkyl)alkylacrylamide or an alkyl or benzyl quaternary salt thereof, acrylamido alkyl sulfonic acid or a salt thereof, or a combination thereof, wherein the second monomer does not comprise the first monomer.

2. The polymer of claim 1, wherein the first monomer comprises DBAPAMA or an alkyl, acetyl, acryloyl or benzyl quaternary salt thereof.

3. The polymer of claim 1, wherein the first monomer comprises N-[3-(diisobutyl)propyl]methacrylamide or an alkyl, acetyl, acryloyl or benzyl quaternary salt thereof.

4. The polymer of claim 1, wherein the first monomer comprises N-[3-(diisopentyl)propyl]methacrylamide or an alkyl, acetyl, acryloyl or benzyl quaternary salt thereof.

5. The polymer of claim 1, wherein the second monomer comprises the N-alkylacrylamide, the N-alkyl (alkyl)acrylamide, or a combination thereof.

6. The polymer of claim 5, wherein the N-alkylacrylamide comprises isopropylacrylamide (IPA) or isopropylmethacrylamide (IPMA).

7. The polymer of claim 1, wherein the second monomer comprises the ((dialkylamino)alkyl)acrylamide or an alkyl quaternary salt thereof, the ((dialkylamino)alkyl)alkylacrylamide or an alkyl quaternary salt thereof, or a combination thereof.

8. The polymer of claim 7, wherein the ((dialkylamino)alkyl)acrylamide or an alkyl quaternary salt thereof comprises ((dimethylamino)propyl)acrylamide, acrylamidopropyl trimethylammonium chloride (APTAC), or a combination thereof; or the ((dialkylamino)alkyl)alkylacrylamide or an alkyl quaternary salt thereof comprises methacrylamidopropyl trimethylammonium chloride (MAPTAC), N-(2-(dimethylamino)ethyl)methacrylamide, N-(3-(dimethylamino)propyl)methacrylamide, or a combination thereof.

9. The polymer of claim 1, wherein the second monomer comprises IPMA, MAPTAC, 2-(dimethylamino)ethyl methacrylamide, 2-acrylamido-2-methyl propane sulfonic acid, 2-acrylamido-2-methyl propane sulfonic acid sodium salt, methacrylamide, 2-hydroxyethyl methacrylate, or a combination thereof.

10. The polymer of claim 1, wherein the weight average molecular weight of the polymer is from about 300 Daltons to about 30,000 Daltons.

11. The polymer of claim 1, wherein the first monomer comprises DBAPAMA or an alkyl, acetyl, acryloyl or benzyl quaternary salt thereof and the second monomer comprises isopropylacrylamide (IPA) or isopropylmethacrylamide (IPMA).

12. The polymer of claim 11, wherein the molar ratio of the second monomer to the first monomer is from about 7:1 to about 12:1.

* * * * *